United States Patent
Venable

(10) Patent No.: US 12,210,638 B2
(45) Date of Patent: *Jan. 28, 2025

(54) AUTHORIZATION AND ACCESS CONTROL SYSTEM FOR ACCESS RIGHTS USING RELATIONSHIP GRAPHS

(71) Applicant: Brex Inc., Draper, UT (US)

(72) Inventor: Jeff Venable, Union City, CA (US)

(73) Assignee: Brex Inc., New York, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/564,574

(22) Filed: Dec. 29, 2021

(65) Prior Publication Data

US 2023/0205898 A1     Jun. 29, 2023

(51) Int. Cl.
*G06F 21/60* (2013.01)
*G06F 21/62* (2013.01)

(52) U.S. Cl.
CPC ........ *G06F 21/604* (2013.01); *G06F 21/6227* (2013.01); *G06F 2221/2141* (2013.01)

(58) Field of Classification Search
CPC .............. G06F 21/604; G06F 21/6227; G06F 2221/2141
See application file for complete search history.

(56) References Cited

U.S. PATENT DOCUMENTS

| | | | |
|---|---|---|---|
| 7,331,058 B1 * | 2/2008 | Gladney | G06F 21/6218 726/2 |
| 7,716,492 B1 | 5/2010 | Saulpaugh et al. | |
| 10,091,206 B2 * | 10/2018 | Jones-Mcfadden | H04L 67/535 |
| 10,242,223 B2 * | 3/2019 | Kreutzer | G06F 16/9535 |
| 10,491,584 B2 * | 11/2019 | Tewari | H04L 63/0869 |
| 11,108,828 B1 * | 8/2021 | Curtis | H04L 63/20 |
| 11,681,724 B2 * | 6/2023 | Stein | G06F 16/26 705/325 |
| 11,899,810 B2 * | 2/2024 | Piecko | G06F 16/10 |
| 2007/0185814 A1 * | 8/2007 | Boccon-Gibod | H04L 9/0825 705/51 |
| 2015/0101066 A1 * | 4/2015 | Fram | G06F 21/6245 726/28 |
| 2015/0248560 A1 * | 9/2015 | Pathak | G06F 21/00 726/26 |
| 2016/0283699 A1 * | 9/2016 | Levin | G06F 21/44 |
| 2017/0230378 A1 * | 8/2017 | Bliss | H04L 63/0428 |

(Continued)

*Primary Examiner* — Javier O Guzman
(74) *Attorney, Agent, or Firm* — Perkins Coie LLP

(57) ABSTRACT

There are provided systems and methods for an authorization and access control system for access rights using relationship graphs. A service provider may provide an authorization and access control system that allows users within the service provider and/or customer entities to assign and change access rights or permissions to computing resources. When providing control of these access rights, the service provider may utilize relationship graphs, queried and generated using a graph database, to visualize and determine access rights that are inherited through different relationships and policies defining these access rights. The relationship graph may show edges for nodes that correspond to related objects, such as actors, groups, and resources. Paths over the relationship graph may be used to determine access rights that may be inherited by users. Once determined, these access rights may be established and/or updated with computing systems.

20 Claims, 11 Drawing Sheets

(56) References Cited

U.S. PATENT DOCUMENTS

| | | |
|---|---|---|
| 2018/0247073 A1* | 8/2018 | Kreutzer .............. G06F 21/6227 |
| 2018/0262510 A1* | 9/2018 | Su ........................ G06F 21/6218 |
| 2019/0324972 A1 | 10/2019 | Karpistsenko et al. |
| 2021/0097061 A1 | 4/2021 | Amihod et al. |
| 2021/0168150 A1* | 6/2021 | Ross ................... G06F 16/9024 |
| 2022/0300527 A1* | 9/2022 | Stein .................... G06Q 50/265 |

* cited by examiner

| Resource 330 | Access 332 | Path 334 |
|---|---|---|
| card-5678 336 | [write] | Jeff -> security-engineers -> trust -> card-5678 |
| card-1234 338 | [read, write] | Jeff -> card-1234 |
| cash-9876 340 | [read, write] | Jeff -> cash-9876 |

AUTHORIZATION AND ACCESS CONTROL SYSTEM FOR ACCESS RIGHTS USING RELATIONSHIP GRAPHS

TECHNICAL FIELD

The present application generally relates to providing authorizations and access to data, operations, and services within computing systems and more specifically to relationship graphs of unique identifiers in computing systems to grant access rights within an access control system.

BACKGROUND

Service provider systems may provide services to customer entities, such as businesses and companies, through computing systems and networks. These services may include computing services for digital accounts, credit and underwriting, expense management, and the like. When providing services to entities, both internal and external end users, as well as their associated computing devices and systems, may require access to data, applications, financial accounts or instruments, and other computing operations. These access rights or permissions may be granted by administrators and may be custom configured for each end user and/or entity. However, adding and removing these permissions and otherwise configuring trust scenarios requires significant time and computing resources, which include determining and coding the permissions. Moreover, if rules and permissions change, development teams may have difficulty keeping up with those changes and revising rules and permissions. This can lead to incorrect permissions being granted, denied, or changed, which may lead to misuse and fraud. Further, permissions generated this way may be linear in focus and not consider relationships between different objects and resources.

Therefore, there is a need to address deficiencies with conventional computing systems used by service providers to provide data access rules and permissions within computing systems.

BRIEF DESCRIPTION OF THE DRAWINGS

FIGS. 3A-E are exemplary diagrams of relationship graphs for determining access rights, permissions, and rules for a service provider system, according to an embodiment;

Figure 1:
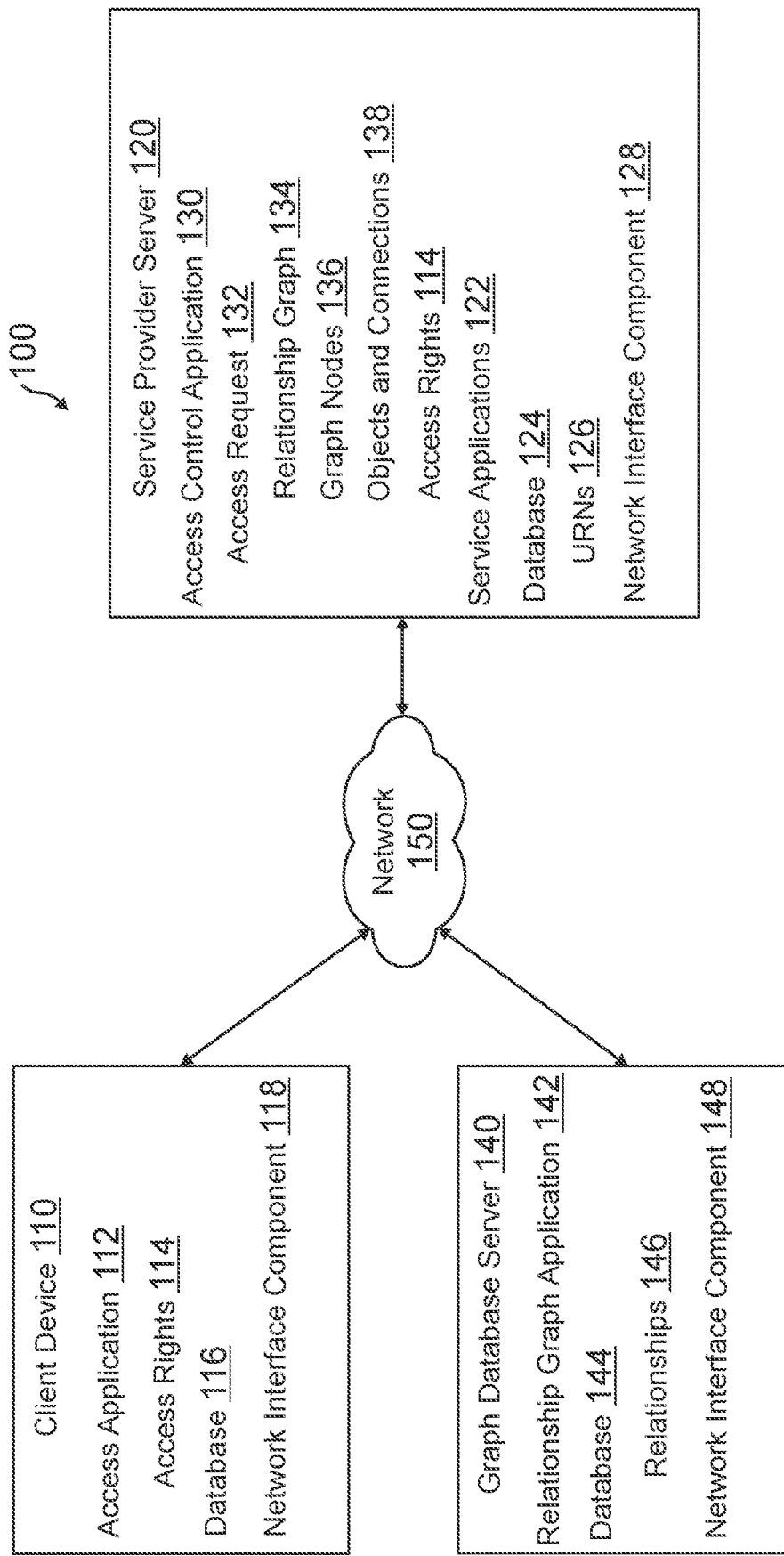
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for authorization and access control of access rights using relationship graphs. Systems suitable for practicing methods of the present disclosure are also provided.

In service provider systems, such as credit provider systems, financial service providers, and/or expense management systems, access rights, permissions, and rules may be used to provide access and authorizations to different data, operations, financial services and/or instruments, accounts, and the like. This may include authorizations and access rights that are granted to end users and/or entities (e.g., businesses, companies, organizations, and the like) for different computing resources. With new companies, such as start-up businesses and enterprises, access rights may constantly shift as end users enter and leave the entity and the entity changes internal computing infrastructures, policies, and goals. Further, the start-up businesses may have different and difficult to ascertain resources, which may affect access rights in an access control system. This requires significant resources to code and time to update and change, which may constantly leave developers behind in properly granting access rights. In order to solve these issues with authorization and access control systems, one or more access control applications may be used that include one or more application programming interfaces (APIs) that specifically integrate and communicate data with a graph database and/or system to generate graph queries for relationship graphs between different users, groups of users, and/or entities to determine permissions and access rights that authorize access to computing resources. This allows for real-time or near real-time determination of access rights and permissions, which allows for periodic and/or continual adjustment of access rights within a computing system.

An online service provider may provide an account, credit, and/or expense management system that may provide computing services to entities, as well as connect with one or more financial computing systems for financial accounts for these services. Financial accounts provided or serviced by the service provider may include one or more credit accounts, debit cards, direct debit/credit through automated clearing house (ACH), wire transfers, gift cards, and other types of funding sources that may be issued to the entity by the online system and/or other financial service providers (e.g., banks). Thus, a networked system and provider may include a framework and architecture to provide payment gateways, billing platforms, e-Commerce platforms, invoicing, and additional services. For example, a credit provider system may offer services, software, online resources and portals, and infrastructure used by entities for these services. When providing services to entities, an authorization and access control system may be used to designate access rights to different end users, groups of users, and/or other entities to computing resources of the service provider's and/or entity's computing systems.

In this regard, an entity, such as a company or other organization, may establish an account for these services, as well as request one or more payment cards or other financial accounts for the entity. These accounts and/or payment cards may be used by employees, management, and the like of the entity to process payments and may require different access rights in order to utilize. Conventionally, the entity may establish the account by providing necessary documents to verify the entity's identity and/or business standing, such as incorporation documents, EIN, tax status and/or documents, and the like. The entity may also provide data regarding the entity's financial status, accounts, and balances, such as initial seed money, investments, and global available balance(s) that may be used for repayment of extended credit. In this regard, the entity may provide access or a link to data, such as through an integration with one or more banking systems utilized by the entity for one or more available balances of funds. After onboarding and/or establishing an account, access rights to the account, computing services provided through the account, and/or account data and services (e.g., financial data, financial accounts and/or payment instruments, and the like) may be available to the entity.

In order to manage these access rights, the service provider may provide an authorization and access control system that manages access rights via relationship graphs that identify an actor, an action, and a resource being acted on in order to define permissions and access rights. This allows for a flexible policy-based access control (PBAC) mechanism that allows for flexibility in types of parameters used to define policies for access rights and permissions. The policies may also include rules that allow for matching users and user contexts with attributes to determine access rights. Permissions may also be referred to as access rights or authorizations, which may correspond to rules that define the rights by certain users, groups of users, and/or entities to access computing resources, such as data, applications, operations, and the like within a computing system. However, instead of utilizing conventional PBAC systems, which may utilize linear queries such as if a user may perform a particular action on a resource, relationship graphs determined using a graph database and graph query language may be used to provide one to many, many to one, and many to many type queries with transitive relationships. This allows customer entities to customize rules based on different attributes.

For example, within the computing infrastructure and system of the service provider that utilizes the authorization and access control system, "things," such as users, accounts, groups of users, entities, resources, roles, permissions, policies, and the like may be associated with universally unique identifiers (UUIDs) in order to identify those things. This eliminates the need to utilize personally identifiable information (PII) that may be sensitive or at risk of misuse or misappropriation. In this regard, uniform resource names (URNs) may be used as a schema for uniform resource identifiers (URIs) that correspond to these UUIDs for things within a name space. URNs may be available even after the associated resource or object no longer exists within the computing system, such as if the resource or object is removed from the computing system. URNs may not need to be utilized to specifically locate the corresponding object at a specific address, but instead serve as a template for another parser to locate data. The identifiers may serve as a primary lookup key in a database. Thus, URNs may not need to be resolved using a network address, a virtual address, or personally identifiable information, such as by allowing the graph to be overlaid onto a policy without having to rewrite the framework for that policy (e.g., by integrating libraries).

Using URNs, relationship graphs may be used to correlate different objects and resources in order to define access rights based on roles, rules, permissions, policies, and the like. For example, URNs within the access control system may include accounts, users, resources, groups, roles, permissions, and policies. In this regard, relationship graphs or social graphs may correspond to graphs in two or three-dimensional space that represent relationships between different graph objects. Graph objects may include nodes for the URNs of the graph objects, where each node is associated with a URN that defines the corresponding object and/or resource within the computing system of the service provider and/or entity. The connections of an object to different objects may show relationships between objects. For example, a user that is linked to a particular financial instrument, such as a personal credit card and/or a credit card for a department that the user works in, may be shown through a connection between those nodes in the relationship graph. These may be shown through linear relationships between objects, where objects may be linked and represented in a relationship or social graph. In some embodiments, graphs may be directed where edges (e.g., the lines showing an ordered pair of nodes) may flow in different directions for different types of relationships. For example, edges that vector in an upwards direction may represent membership relationships between the nodes (e.g., the objects or resources in the computing system), where edges that vector in a downward direction may show access relationships between those nodes. These may be used to determine paths that define permissions and access rights, for example, whether there is a path between a queried user to one or more groups and then to a resource to define a permission. These pathways, edges, objects, and nodes may be used with a data visualization and editing tool that allows for simplified security and/or staffing requirements for entities serviced by one or more service providers.

In this regard, a graph database may serve as a centralized security resource to provide relationship graphs between users. The service provider may implement a Policy Effect Request Match (PERM) model, which persists policies as definitions for a subject, object, action, and the like. These may be defined as simple rules for what different objects can do, are members of, or have access to within the computing system. The structure of rules defining these policies may be flexible to handle role-based access control (RBAC) and attribute-based access control (ABAC) using the graph database without requiring access control lists. The graph database may then load the rules and place them into maps in the graph database. The graph database may include APIs that allow for API calls to be exchanged with the service provider's computing system in order to persist policies and query the database.

The graph database may be specifically selected and implemented to allow for a query language tailored to graph queries. The graph database and query APIs, as well as the APIs to persist and change policies and rules, may be domain specific for graph queries and the query language of the graph database. In some embodiments, the query language may correspond to ArangoDB Query Language (AQL). The graph database may further allow a visualization of a relationship graph when queried and returned so that end users and/or entities may visualize the relationship graph. This may allow for access rights to be changed and updated through the relationship graphs, such as by adding or deleting connections or edges, changing vectorization of edges, and/or altering the connections or edges to be linked to different nodes in the relationship graph. Thus, the graph database may also return a visualization when queried for an access right and/or relationship graph of access rights. In this regard, access APIs for the graph database used by the service provider to interface with the graph database and obtain a relationship graph may include create policy (e.g., to create a PERM instance of a policy), get policy or policies, update policy, delete policy, check access, query actions, and/or query resources APIs. Data level queries allow for efficient evaluation of all rules, policies, and the like in parallel for entities by a service provider.

The graph database may further include or be utilized with further APIs. Directory APIs may implement create, read, update, and delete (CRUD) operations for users. For example, the APIs may include create user, get user, update user, and/or delete user APIs for actor vertices for a user ID (e.g., a UUID or URN). Organization APIs may also implement CRUD operations for groups and user memberships, such as create group, find group, delete group, add member, and/or remove member. Further, a reporting API subset may implement manager relationships for managers of users within an entity, such as get manager, get all managers, set manager, get directed reports, and/or get all reports. Manager relationships may be used with the relationship graphs in order to provide an additional form of permission granting, such as by providing approvals for reports from manager level on down. This may include approval of expense requests for employees and the like of a manager when linked by a manager relationship via a relationship graph. A resource API subset may be linked to resources that are governed by access permissions, such as a spend limit, credit card account, or the like, which may include create resource, find resource, rename resource, and/or delete resource.

A query may be generated with an actor, a permission or access right request or query, and/or a resource to be acted on by the user based on the access right request. Each policy may correspond to an edge in the relationship graph (e.g., two nodes with a connection), where one node is an actor and another a resource. Vertices in the relationship graph may therefore correspond to a base object and the corresponding URN. Once queried, the relationship graph may be returned, which may be parsed and analyzed to determine connections between vertices based on edges of the relationship graph. A graph traversal may be used to return all paths from a starting actor to the target resource and therefore determine which access rights are provided to the actor to the resource.

Further, the graph traversal may be used to designate the access rights of each user to resources within the computing system based on the pathways to resources and whether there is a policy providing an access right to those resources. Further, multiple paths identified during the graph traversal may allow for a union of multiple access rights. For example, one pathway may grant a 'read' access right to a regular user for a resource, while another pathway may grant a 'write' access right to an administrator for the resource, which may result in a 'read/write' access right. However, altering either pathway to remove an access right may update the 'meta-right' by removing the component access right to the union of access rights, and automatically remove that component access right without having to update or modify all other policies. Once the graph traversal in completed, a response may be provided of whether the user has access to a specific resource. This may also be based on a risk analysis of providing access rights to the resource. Further, if the traversal is used to determine access rights for a user, then the access rights may be enabled and/or updated with the service provider and/or entity's computing system. Vertices and/or edges may include arbitrary attributes established by any computing service, user, or the like using the computing system providing the graph traversal. Thus, after a traversal, paths may be optionally returned to the caller in order to demonstrate how an access is achieved and/or to return related metadata attributes for further evaluation by the external calling system without requiring the logic being built into the query engine of the graph.

Further, a visualization and editing tool may be provided for displaying, visualizing, modifying, and/or changing the access rights and permissions of users using the relationship graph. This may allow for changing permissions, policies, and/or access rights on the fly and by users without requiring of coding by those users so that a customer entity may be provided with automated reprogramming of the graph and/or security rules to achieve a desired outcome visually. In this regard, a What You See Is What You Get (WYSIWYG) data visualization and editing tool may be provided with the relationship graph and/or graph database, which may be provided through one or more user interfaces. The WYSIWYG tool may be displayed in the user interface(s) that allows for matching connectivity between nodes, and therefore users, permissions, groups, and the like, in order to generate access rights and other policies for users, groups, and the like. This may further be used to break or delete pathways, such as by removing an edge connecting two nodes, which implements a security change to the underlying access rights and security framework via the WYSIWYG tool.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a customer or client device 110, a service provider server 120, and a graph database server 140 in communication over a network 150. A user (not shown) may correspond to an employee, contractor, shareholder, or other suitable person of a company (not shown and generally referred to herein as an "employee") associated with client device 110, which may be used to query for access rights of the user or another user of the company. Service provider server 120 may provide graph-based access rights through an access control system using graph database server 140 to return relationship graphs.

Client device 110, service provider server 120, and graph database server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be utilized by an employee of an entity or company that employs one or more users, for example, to utilize authorization and access control systems with service provider server 120. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In this regard, client device 110 includes one or more processing applications which may be configured to interact with service provider server 120 to request access rights for users and the like. Although only one communication device is shown, a plurality of communication devices may be used and function similarly.

Client device 110 of FIG. 1 includes an access application 112, a database 116, and a network interface component 118. Access application 112 may correspond to executable processes, procedures, and/or applications with associated hardware. In other embodiments, client device 110 may include additional or different modules having specialized hardware and/or software as required.

Access application 112 may be implemented as specialized hardware and/or software utilized by client device 110 to query service provider server 120 for access rights via an access control system. In this regard, access application 112 may correspond to software, hardware, and data utilized by a user associated with client device 110 to enter, store, and process data associated with an account, which may be established with service provider server 120 and be used by computing systems for services provided by service provider server 120. In order to establish the account, access application 112 may be used to provide information necessary to establish the account, such as a credit account for an entity associated with client device 110 that is managed and provided by service provider server 120. After establishing the account, access application 112 may be used to review, and configure access rights and permissions to computing resources with service provider server 120.

In various embodiments, access application 112 may includes a general browser application configured to retrieve, present, and communicate information over the Internet (e.g., utilize resources on the World Wide Web) or a private network. For example, access application 112 may provide a web browser, which may send and receive information over network 150, including retrieving website information, presenting the website information to the user, and/or communicating information to the website, including payment information. However, in other embodiments, access application 112 may include a dedicated application of service provider server 120 or other entity, which may be configured to assist in establishing and maintaining accounts and configuring access rights to computing resources for users, groups of users, and/or entities.

In various embodiments, access application 112 may be utilized to provide a query to service provider server 120 for determination of one or more of access rights 114 for a user or other object within a computing system to resources of the computing system. The query may include a designation of an actor, such as a user that has an account, UUID, and/or URN in a computing system of service provider server 120 and/or an entity corresponding to client device 110. The query may further include an access right request or question (e.g., does the user have access?) and a corresponding resource (e.g., to a credit card account) for access rights 114. The query may be provided to service provider server 120 for processing using a relationship graph from graph database server 140. The query may be in or may be converted to a query language, such as AQL, used by graph database server 140. The relationship graph may be used to provide a result, such as access rights 114 and/or permissions of a user to resources.

Access application 112 may retrieve and/or access data from an external financial institution or computing system, which may be provided with access rights 114 for an access control system of service provider server 120. Access application 112 may be integrated with service provider server 120 so that data may be shared with service provider server 120, for example, by providing the information via a data sharing process. In further embodiments, access application 112 may access an online platform and database that provides data and/or permit service provider server 120 access to the data with the online platform, such as by providing information to allow access to the data using an integration between computing systems for a financial system and service provider server 120.

Client device 110 may further include database 116 stored in a transitory and/or non-transitory memory of client device 110, which may store various applications and data and be utilized during execution of various modules of client device 110. Thus, database 116 may include, for example, identifiers such as operating system registry entries, cookies associated with access application 112, identifiers associated with hardware of client device 110, or other appropriate identifiers, such as identifiers used for payment/account/device authentication or identification. Database 116 may include queries and returned query results, such as access rights 114.

Client device 110 includes at least one network interface component 118 adapted to communicate with service provider server 120 and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Service provider server 120 may be maintained, for example, by an online service provider, which may provide account, payment instruments and credit, and/or expense management services to companies, businesses, and other entities. In this regard, service provider server 120 includes one or more processing applications which may be configured to interact with client device 110, graph database server 140, and other devices or servers to facilitate access control and rights for resources in a computing system. In one example, service provider server 120 may be provided by BREX®, Inc. of San Francisco, CA, USA. However, in other embodiments, service provider server 120 may be maintained by or include other types of credit providers, financial services providers, and/or other service provider, which may provide services to companies.

Service provider server 120 of FIG. 1 includes an access control application 130, service applications 122, a database 124, and a network interface component 128. Access control application 130 and service applications 122 may correspond to executable processes, procedures, and/or applications with associated hardware. In other embodiments, service provider server 120 may include additional or different modules having specialized hardware and/or software as required.

Access control application 130 may correspond to specialized hardware and/or software to allow entities (e.g., the entity associated with client device 110) to set, maintain, and update access rights (e.g., access rights 114 and other access rights for other users) to account, credit, expense management, and other services. In some embodiments, the services may be used to receive payment instruments associated with a bank account, extended credit, and/or funding of the company, such as one or more company credit cards. Access control application 130 may further provide management for those issued payment instruments and additional funds/accounts of the company, for example, through expense management processes. In this regard, an entity may first establish an account with access control application 130 by providing company or entity data and onboarding with service provider server 120. The company or entity data may include articles of incorporation, tax status and/or IRS EIN request and confirmation data, and other information that may be utilized to verify a company, business, organization, or charity is proper, valid, and not fraudulent. Such information may further include bank account and funding information, such as verified funding from investors, available funds in a bank or financial account, and the like. Service provider server 120 may onboard the entity associated with client device 110 for services provided by service provider server 120. This may include providing account and/or expense management services, such as based on expenses and balances available to the entity. Further, credit may be extended to the entity based on entity financial data. In this regard, service provider server 120 and/or another issuing entity may provide a payment instrument that is managed by service applications 122. For example, service provider server 120 may issue one or more credit cards for employees of the entity, which may correspond to a real or virtual credit card or other types of payment instruments and instrument identifiers that may be used for company payments.

Access control application 130 may further be used to set access rights through an access control system. The access rights may be based on different policies and may manage users access rights and permissions to different resources. For example, access control application 130 may receive an access request 132 from client device 110, such as a query having at least a user or a resource identifier when determining access rights 114 requested by client device 110 by access request 132. Access request 132 may further include an access right request (e.g., a question or query for an access right by a user to a resource), as well as the corresponding user or resource requested for the relationship. In some embodiments, access request 132 may further include a request to identify and then enable and/or update access rights to resources by a user.

Access control application 130 may utilize the query to determine relationship graph 134 using graph database server 140. Graph database server 140 may correspond to a graph database that may be queried to return a relationship or social graph that is used to determine access rights by users to resources of a computing system or infrastructure. In this regard, the query may be converted to, constructed in, and/or generated in a query language for graph database server 140, such as AQL for ArangoDB™ databases and systems. Other database systems may include Neo4J, OrientDB, PostGRES recursive Common Table Expressions (CTE), or other graph databases. In further embodiments, the graph database and/or graph database server 140 may be internal to service provider server 120 instead of an external server and/or database in communication with service provider server 120 over network 150. Graph database server 140 may return relationship graph 134, which includes graph nodes 136 for objects and connections 138. Graph nodes 136 having objects and connections 138 may correspond to edges in a graph, such as two connected nodes having a connection and a vector. Using graph nodes 136 having objects and connections 138, access rights 114 may be determined and returned to client device 110. Further, access rights 114 may be used by access control application 130 to configure and/or update access rights and permissions for a user to resources with service provider server 120.

Service applications 122 may correspond to specialized hardware and/or software to allow entities (e.g., the entity associated with client device 110) to provide account services, process and provide credit or loan extensions, process financial transactions using one or more company credit cards or other financial instruments, and/or provide expense management systems. Service applications 122 may therefore correspond to one or more services provided by service provider server 120 to an entity, such as the entity associated with client device 110. In some embodiments, the services may include account and/or credit services. In such embodiments, service applications 122 may include underwriting systems and models, which may extend credit or other loans based on parameters for an entity. In further embodiments, service applications 122 may also provide expense management services, such as those that may integrate with an entity's expense, payroll, human resources, business panning, and the like to provide enterprise resource planning (ERP) services.

In some embodiments, service applications 122 may be used to process transaction data, which may include information about the transaction (e.g., cost, items, additional fees including tax or tip, merchant identifier, description, and the like) and an identifier for the entity associated with client device 110 and/or the used payment instrument (e.g., credit card number for the credit account). Service applications 122 may then utilize one or more payment networks to process the transaction, such as by issuing a payment over a payment network and/or by requesting payment by a credit issuing bank or institution to the merchant and/or acquiring bank or institution. In other embodiments, the credit card and payment network may be managed by another entity and/or payment network, where an integration by service provider server 120 with the network may allow for acquisition of transaction data by service applications 122 in real-time or substantially in real-time. Service applications 122 may further issue transaction histories and provide accounting and recordation of transaction data, such as with the ERP resources provided by service applications 122. Access to services and resources provided by service application 122 may also be controlled by access control application 130 based on relationship graphs generated with graph database server 140, Additionally, service provider server 120 includes database 124. As previously discussed, the user, entity, and/or entity corresponding to client device 110 may establish one or more accounts with service provider server 120. Accounts in database 124 may include customer credit accounts and other entity information, such as name, address, additional user financial information, and/or other desired entity data. Further, database 124 may include URNs 126 used for identifying users, accounts, groups of users, entities, resources, roles, permissions, policies, and the like. URNs 126 may correspond to strings that define and identify these objects and resources so that access rights may be determined in an access control system and identified for users.

In various embodiments, service provider server 120 includes at least one network interface component 128 adapted to communicate with client device 110, graph database server 140, and/or other devices or servers over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

Graph database server 140 may correspond to a computing system and/or network utilized by a graph database for providing graph database and relationship graph services to service provider server 120. This may include graphs that show relationships between different nodes that represent users, resources, and other objects within a computing system of service provider server 120 or another entity. Although only one server is shown, a plurality of servers and/or database providers and their corresponding computing systems may be used and function similarly and include API integrations with service provider server 120 for graph database querying.

Graph database server 140 of FIG. 1 includes a relationship graph application 142, a database 144, and a network interface component 148. Relationship graph application 142 may correspond to executable processes, procedures, and/or applications with associated hardware. In other embodiments, graph database server 140 may include additional or different modules having specialized hardware and/or software as required.

Relationship graph application 142 may correspond to specialized hardware and/or software to allow service providers and users to query a database to return graphs to graph queries. In some embodiments, graph database server 140 may processes to utilize a graph query language, such as AQL wherein graph database server 140 may correspond to ArangoDB™. In this regard, relationship graph application 142 may receive a graph query from service provider server 120 for a query to determine relationships and connections between different objects based on relationships 146 stored to database 144. Relationships 146 may correspond to policies and the like that may be written to connect users to resources. Thus, relationship graph application 142 may further include processes to establish relationships 146 as policies for users and resources. Thus, relationship graph application 142 may include APIs exposed to service provider server 120 for integrations and exchange of API calls for policy establishment and/or query submission and processing.

The query may correspond to access request 132, where relationship graph application 142 may return relationship graph 134 having graph nodes and objects and connections 138. In other embodiments, relationship graph 134 may not need to fully be returned to service provider server 120, such as if the query from access request 132 instead identifies a particular request for a relationship, access, or permission for a user to a particular resource (e.g., by identifying if a path exists between the user and the resource in relationship graph 134). In various embodiments, relationship graph 134 may include nodes and edges connecting nodes that have a corresponding vectorization to show memberships in groups and/or access to resources. Service provider server 120 may then use relationship graph 134 for determining access rights and permissions of users to resources.

Graph database server 140 may further include database 144 stored in a transitory and/or non-transitory memory of graph database server 140, which may store various applications and data and be utilized during execution of various modules of graph database server 140. Thus, database 144 may include, for example, identifiers such as operating system registry entries, identifiers associated with hardware of graph database server 140, or other appropriate identifiers, such as identifiers and credentials used for data and account identification and/or authentication. Database 144 may include relationships 146 that correspond to coded policies that may be used to generate relationship graphs.

Graph database server 140 includes at least one network interface component 148 adapted to communicate with client device 110, service provider server 120, and/or another device or server. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices.

Network 150 may be implemented as a single network or a combination of multiple networks. For example, in various embodiments, network 150 may include the Internet or one or more intranets, landline networks, wireless networks, and/or other appropriate types of networks. Network 150 may correspond to small scale communication networks, such as a private or local area network, or a larger scale network, such as a wide area network or the Internet, accessible by the various components of system 100.

Figure 2:
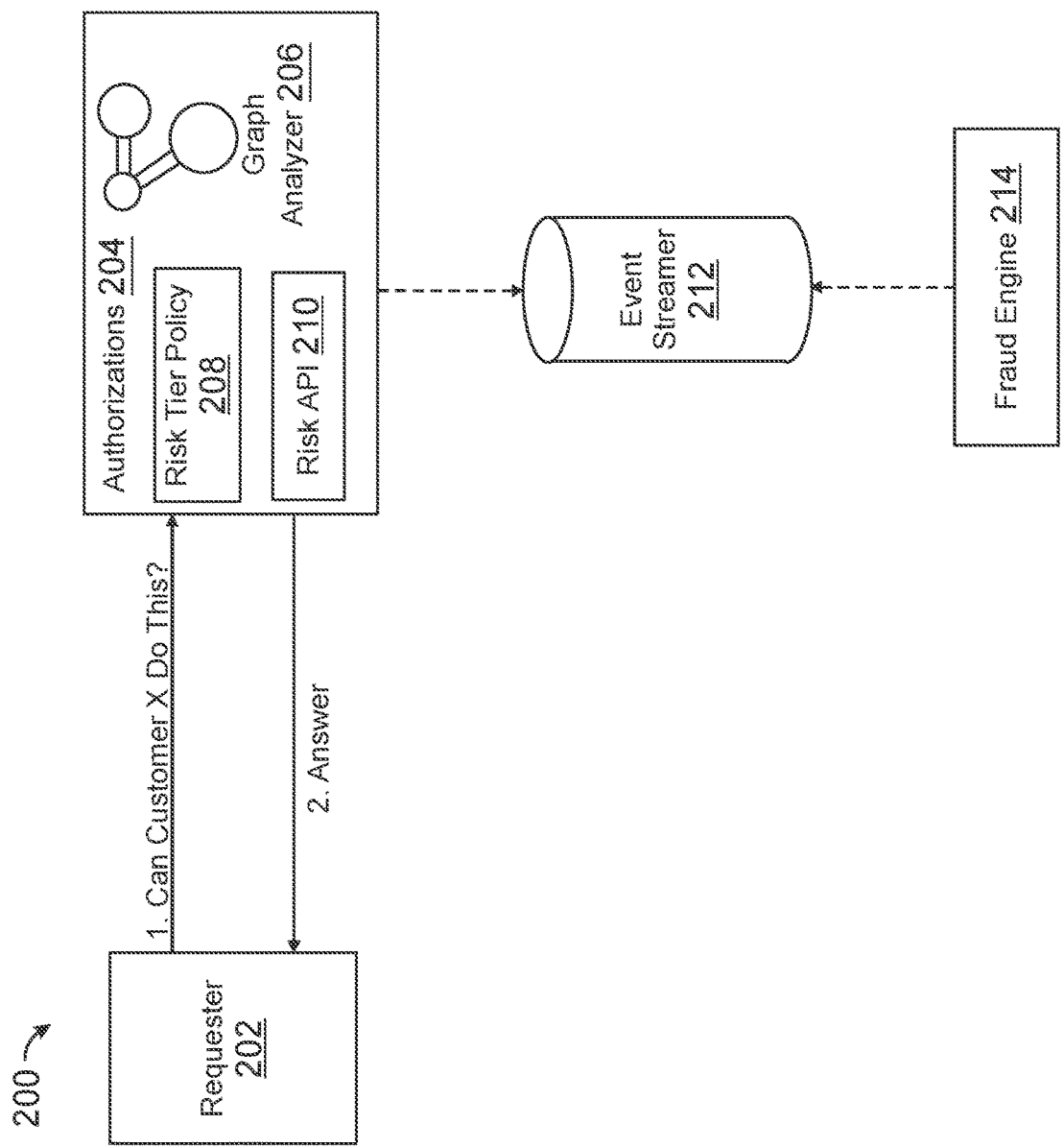
FIG. 2 is an exemplary system architecture for providing graph-based access rights in an authorization and access control system, according to an embodiment.

FIG. 2 is an exemplary system architecture 200 for providing graph-based access rights in an authorization and access control system, according to an embodiment. System architecture 200 includes a requester 202 that may request a system for authorizations 204, where requester 202 may utilize client device 110 to transmit queries for authorizations 204 from service provider server 120 discussed in reference to system 100 of FIG. 1. In this regard, requester 202 may provide a query at an interaction 1 with authorizations 204 in order to receive a response at an interaction 2 from authorizations 204 based on the query and a relationship graph.

In this regard, requester 202 may initially provide the query for determining an access right of a user or entity, which may also include determining multiple access rights such as those granted through a relationship graph. For example, at interaction 1, requester 202 may query authorizations 204 for "can customer entity X do an international wire?" However, in other embodiments, different queries may be more general or more specific to certain resources. Authorizations 204 include a graph analyzer 206, which may be used to analyze relationship graphs received from an external graph database. In this regard, graph analyzer 206 may be further connected to and/or in communication with (e.g., via APIs and through API calls) a graph database and/or graph database system. These communications may allow graph analyzer 206 to query the graph database and receive relationship graphs and/or database responses that are responsive to the query submitted at interaction 1. In some embodiments, authorizations 204 may only require graph analyzer 206 in order to be responsive to requester 202 for the query. Thus, graph analyzer may determine if the corresponding access right, rule, or permission exists for the user or customer entity to the corresponding resource. If so, an answer of yes may be provided by authorizations 204 back to requester 202, however, if not, then an answer of no may be responsive.

However, in other embodiments, authorizations 204 further include a risk tier policy 208 and a risk API 210. Risk tier policy 208 may define different tiers and/or levels of risk and their corresponding users and/or entities. For example, risk tier policy 208 may correspond to one or more business rules and/or models that designate a risk tier or riskiness of different users and/or entities (e.g., low, medium, high risk, and the like). Risk API 210 may be used with event streamer 212 to stream events and data processing requests for risk analysis and fraud detection to fraud engine 214. In some embodiments, with event streamer 212, a Change Data Capture (CDC) may be used to stream Write Ahead Log (WAL) updates from one or more external database systems (e.g., a PostGres database system). These may contain the CRUD operations of UUIDs, which may update a graph by following/consuming such an event stream from event streamer 212. Further, the graph may be overlayed onto one or more existing service provider infrastructures without having to rewrite the infrastructure (e.g., by incorporating libraries). With event streamer 212, the graph may produce an outbound event stream of query activity (e.g., an access check history may become a security audit trail of entity activity within the service provider infrastructure), which may be useful in forensics, fraud analysis, machine learning, and the like.

Fraud engine 214 may respond with a risk analysis, which may be used by authorizations with graph analyzer 206 to determine a corresponding risk in providing the access right to the user or customer entity. For example, graph analyzer 206 may not have a direct pathway that provides the access right, but a risk and/or fraud analysis may be used to grant or deny the rule. Further, even if the access right does exist from a pathway connecting the user or entity to the resource, a risk and/or fraud analysis may indicate that the access right or permission should be denied. Thus, at interaction 2, authorizations 204 are responsive with an answer to requester 202, which may be based on both the relationship graph from graph analyzer 206 and the risk analysis from risk tier policy 208, risk API 210, and fraud engine 214.

FIGS. 3A-3E are exemplary diagrams 300a-300e of relationship graphs for determining access rights, permissions, and rules for a service provider system, according to an embodiment. Diagrams 300a-300e of FIGS. 3A-3E include representations of relationships or social graphs and/or the corresponding access rights for users to resources that may be used by service provider server 120 using access control application 130 discussed in reference to system 100 of FIG. 1. In this regard, diagrams 300a-300e may be executed through API endpoints and calls to determine relationship graphs with a graph database.

Figure 3A:
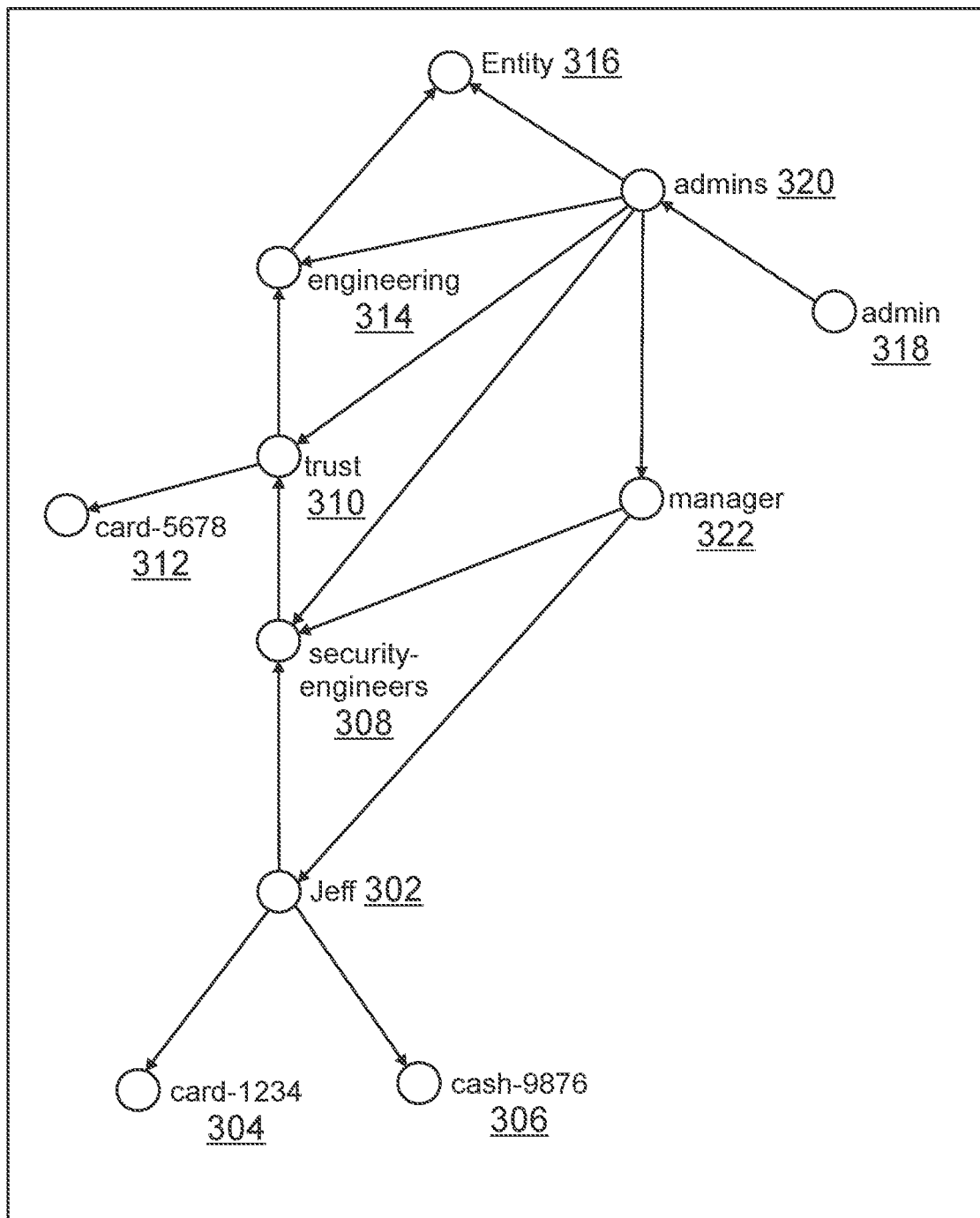
Figure 3C:
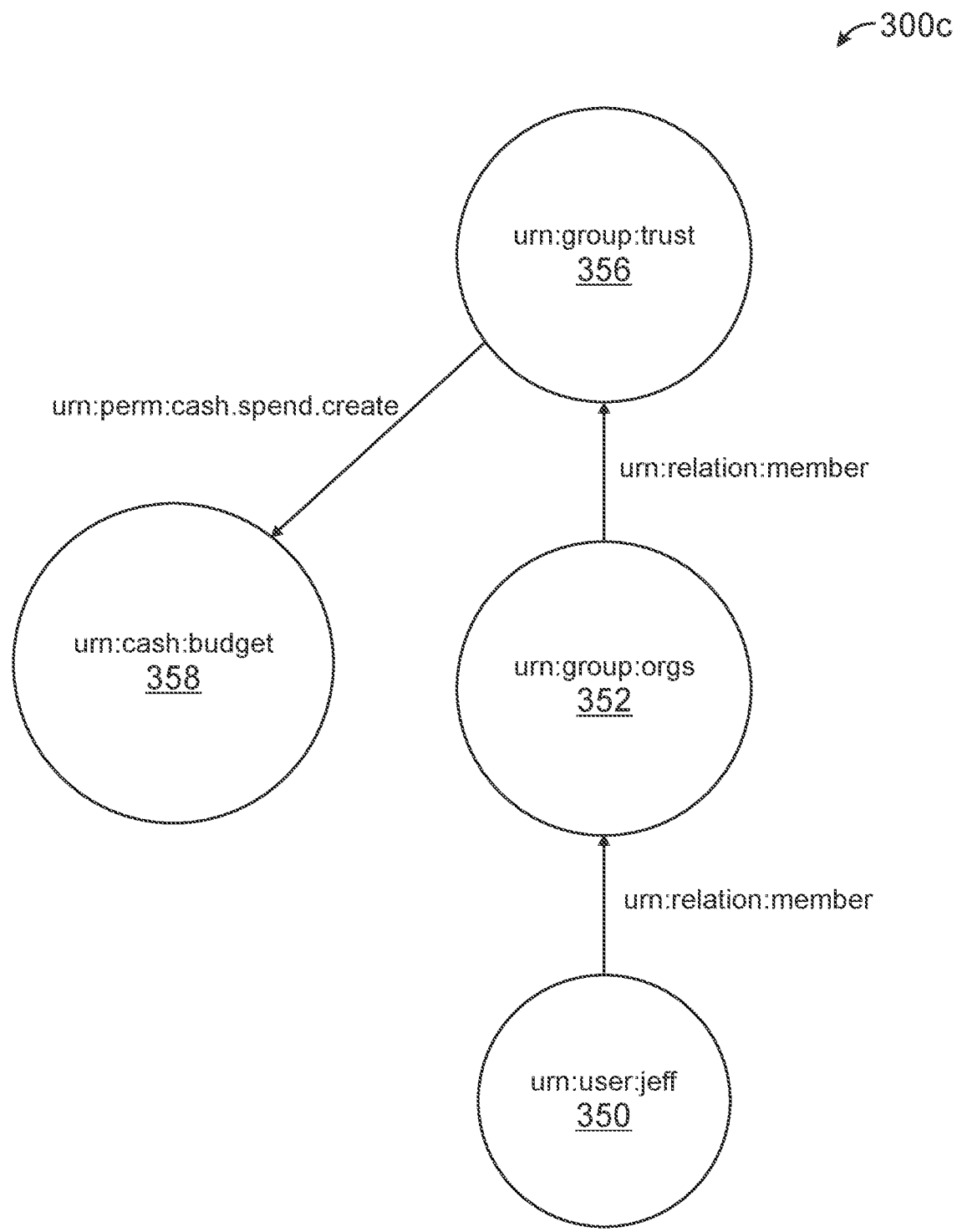
Figure 3D:
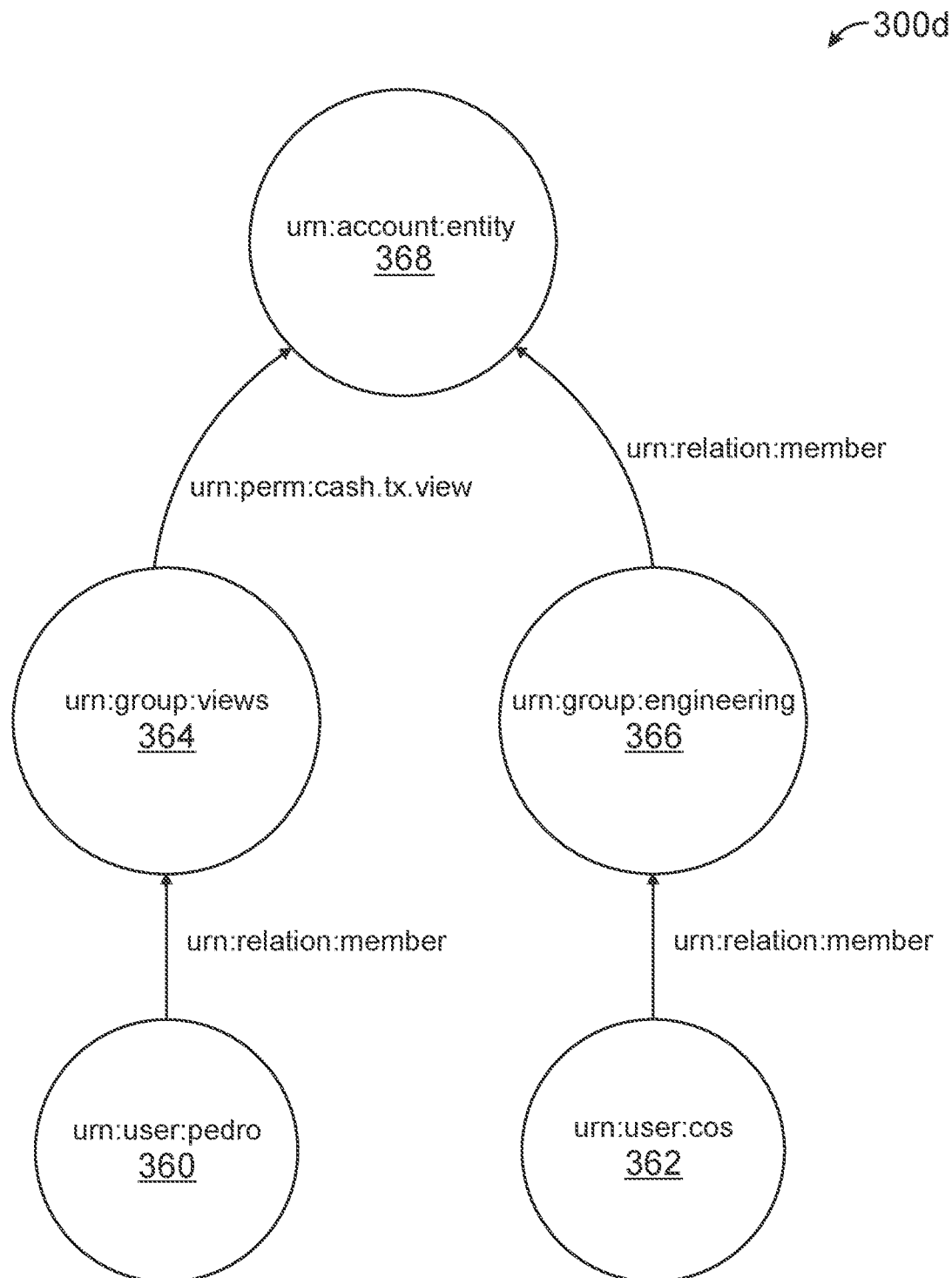
Figure 3E:
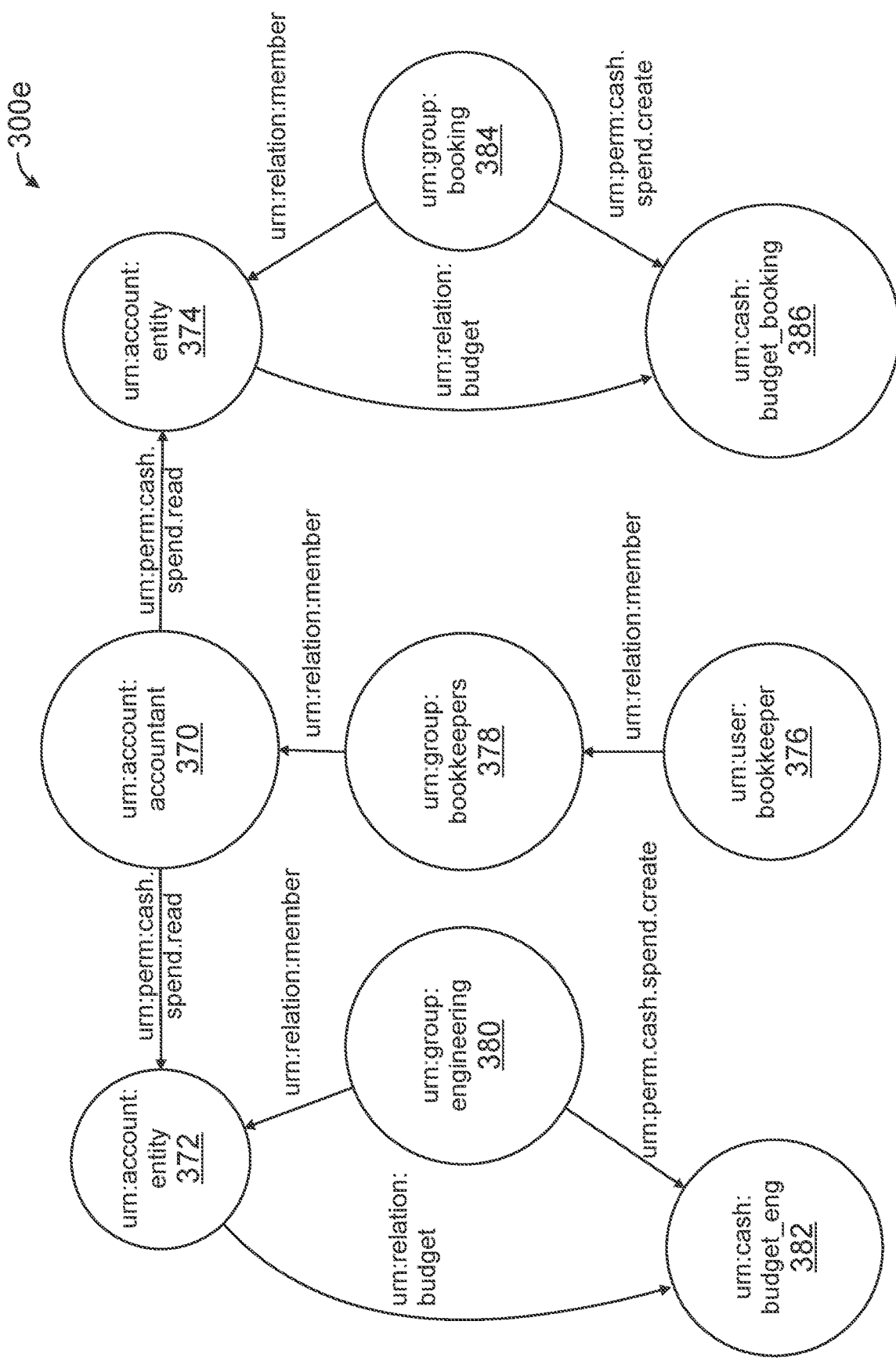

Diagram 300a of FIG. 3A includes a relationship or social graph that connects nodes to form edges that designate relationships between the corresponding actor or resource for each node. In this regard, a user may be designated to determine the corresponding access rights of that user. User 302 is shown as Jeff and is connected to other nodes in the relationship graph of diagram 300b. A query may be received to determine the permissions and/or access rights of user 302 to other nodes, such as whether Jeff has access to certain credit cards and accounts and/or what credit cards and accounts Jeff has access to via the corresponding policies. Thus, the query may request an answer in the form of a table shown in diagram 300b of FIG. 3B. A graph database may return the relationship graph of diagram 300a and/or may provide an answer to the above query in the form of diagram 300b.

When parsing the relationship graph of diagram 300a, such as when performing a graph traversal to determine the access rights of user 302 to different credit cards and/or accounts, access relationships may be determined from the edges and corresponding vectors in diagram 300a. For example, an access relationship may be shown with a downward vector. Thus, user 302 is shown as having access to a first card 304 (e.g., card-1234) and a cash account 306 (e.g., cash-9876) based on the corresponding edges of user 302 to first card 304 and cash account 306 having a downward vector. Thus, user 302 has access rights to first card 304 and cash account 306 and may be granted those access rights or those may be maintained if currently granted in a computing system.

Additionally, user 302 is shown as being a member of security-engineers 308, such as by being a member of an administrative or employee group corresponding to security engineers at an entity 316. Security-engineers 308 are further a member of a trust group 310, which may correspond to a group of employees involved in trust and/or security at entity 316. These memberships are shown through upward vectorization of the edges between user 302 and security-engineers 308, as well as security-engineers 308 and trust group 310. Memberships may therefore designate groups that user 302 may be a member of, and thus may inherit their access levels by virtue of being a member of that group. Trust group 310 may have access to a second card 312 (e.g., card-5678), and therefore user 302 may obtain an access right to second card 312 by being a member of security-engineers 308 and trust group 310. Thus, user 302 includes a third access right to second card 312.

Diagram 300b further shows a table having these three access rights. For example, the table in diagram 300b includes columns for a resource 330 (e.g., the requested resources, such as credit card and/or accounts) that user 302 has access to, an access 332, and a path 334. Access 332 may designate the access rights, such as read and/or write, for the corresponding one of resource 330, while path 334 may designate a pathway over the relationship graph of diagram 300a that allows user 302 access to the corresponding one of resource 330. With second card 336 for resource 330, user 302 is provided an access 332 of only write based on path 334 going through two different groups, where a policy may define what access levels for the access rights provided to the group memberships for user 302. With first card 338, user 302 is provided a direct access policy for path 334, and therefore is provided an access 332 of read and write. Similarly, for cash account 340, user 302 has a direct policy with path 334 that sets access 332 as read and write.

Diagram 300a further shows additional membership and/or access rights for user 302 and/or other users within entity 316. For example, user 302 is further a member of an engineering group 314 based on group memberships via trust group 310, as well as entity 316 based on group memberships via engineering group 314. Within entity 316, there may further be an administrator (admin) 318, which may correspond to an overall administrator that sets certain policies and the like. Admin 318 may therefore have an access right to admins 320, which may be a group of administrators for entity 316. Admins 320 may have an access right to a manager 322, which further include an access right back to user 302. Thus, the relationship graph of diagram 300a may further be used to ascertain other access rights for other users and/or those provided access back to user 302. In various embodiments, by adding, deleting, or changing connections, such as by editing diagram 300e, changes to policies, and therefore relationships and access rights, may be performed.

Diagrams 300c-300e further show additional embodiments of relationship graphs used to determine access rights and/or permissions to resources by users. These are shown through the actor vertices, group vertices, and/or resource vertices at the corresponding nodes of diagrams 300c-300e, which are defined by URN strings and further show connections and edges having URN strings for the policies, permissions, and/or access rights. For example, in diagram 300*c*, a user 350 is shown with a URN string of urn:user:jeff, which is a specific identifier (e.g., a UUID in URI name space scheme for a URN). An upward vector shows a URN string for a relationship as a member to an organizational (orgs) group 352, having a URN string of urn:group:orgs. Orgs group 352 has a URN string for a member relationship to a trust group 356 with a corresponding URN string. In order to show an access right or permission, a permission URN string shows a connection to a cash budget account 358 with a corresponding URN string of urn:cash:budget. User 350 is provided a permission or access right associated with cash budget account 358. Thus, user 350 may be provided a permission to create a spend request based on the UN string connecting trust group 356 to cash budget account 358.

In diagram 300*d*, an access right determination for whether a user has an access policy to view cash transactions made by another user is shown. For example, a first user 360 is a member of a viewers group 364, which is provided a permission to view cash transactions (e.g., URN string urn:perm:cash.tx.view) from an entity account 368. Thus, when a second user 362 that is a member of an engineering group 366 makes cash transactions, which may be made with entity account 368, first user 360 may view those cash transactions via the inherited group membership policy from engineering group 366.

In diagram 300*e*, a single login identity and single account viewer may be shown based on connected access rights from policies for an accountant account 370, such as a bookkeeping firm. In this regard, accountant account 370 has permissions to entity A 372 and entity B 374. With accountant account 370, a bookkeeping user 376 may be a single user within the firm, which is a member of a bookkeeper group 378. Thus, bookkeeping user 376 may be provided with access to accountant account 370. When performing a single login and/or authentication, such as to view a single account viewer having both entity A 372 and entity B 374 information, the permissions and memberships in diagram 300*e* may further be used to provide access to bookkeeping and/or accounting data. For example, through entity A 372's node, bookkeeping user 376 is provided inherited access to an engineering cash budget 382 associated with an engineering group 380. Further, through entity B 374's node, bookkeeping user 376 is provided inherited access to a booking cash budget 386 for a booking group 384 (e.g., one involved in booking travel or lodging).

The corresponding URN strings show the relationships and/or permissions between the vertices and for the edges in the graph. In various embodiments, an addition, a deletion, or a change of the connections between vertices, such as a line between two nodes that defines an edge in the relationship graphs of diagrams 300*c*-300*e*, may be used to change URN strings and their corresponding policies. This may affect membership connections and/or permission or access right connections. For example, by adding a line between two unconnected nodes, a new policy may be written for the corresponding URN string, membership, and/or access right. By deleting a line, a policy may be deleted or changed to reflect the changed line. Similarly, a policy may be deleted or changed when a line is moved between nodes.

Figure 4:
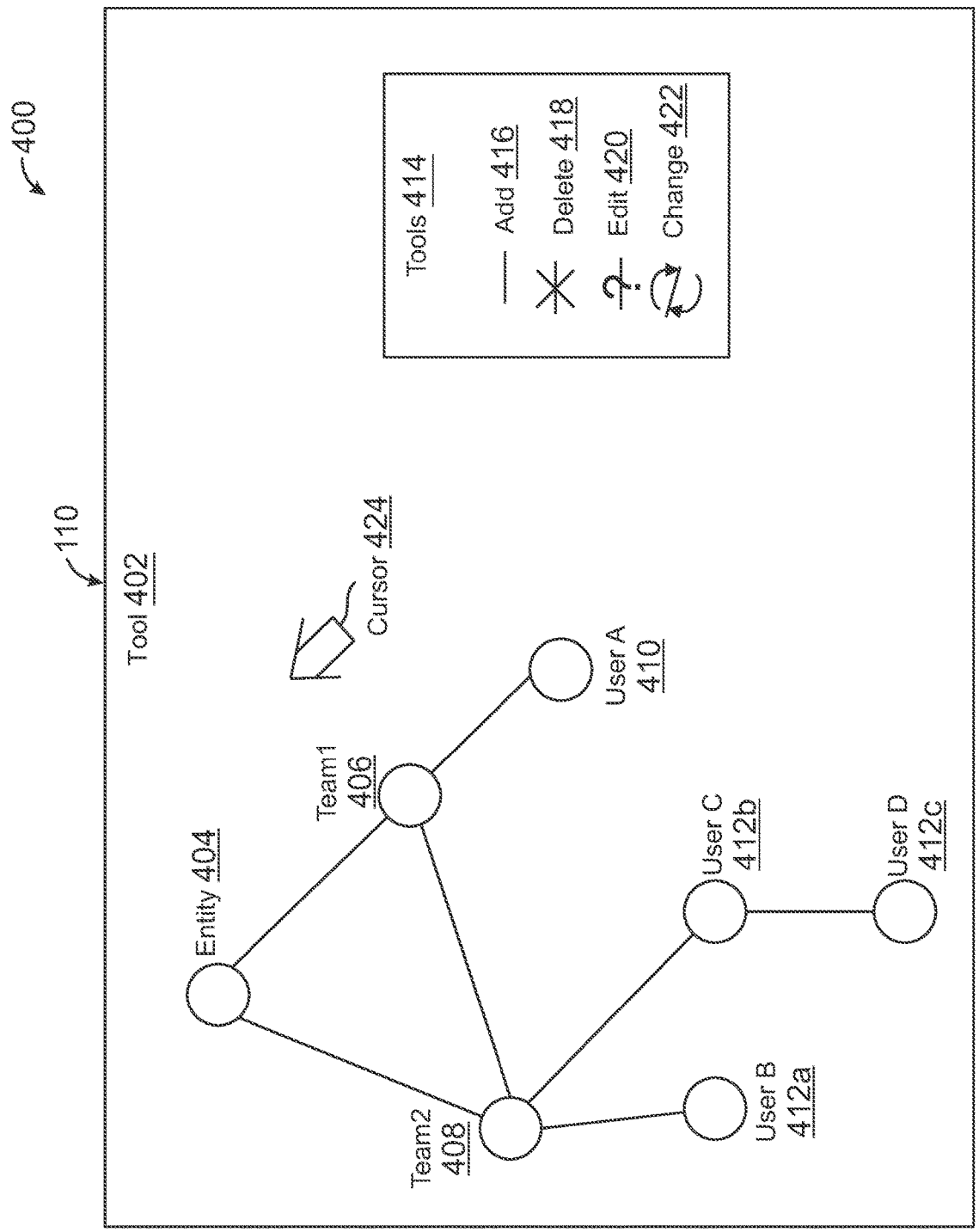
FIG. 4 is an exemplary interface of a security policy visualization and editing tool, according to an embodiment.

FIG. 4 is an exemplary interface 400 of a security policy visualization and editing tool, according to one embodiment. User interface 400 of FIG. 4 includes representations of relationships or social graphs for access rights for users to resources that may be presented in one or more user interfaces of a computing device by service provider server 120 using access control application 130 discussed in reference to system 100 of FIG. 1. In this regard, user interface 400 may be used to provide a WYSIWYG editing tool in order to create, change, and/or delete access rights when edited by customer entities and the like of service provider server 120.

For example, client device 110 may be used to access one or more computing resources and/or services provided by service provider server 120 (e.g., using access control application 130). This may be used in order to present tool 402 to one or more users. Tool 402 may be used in order to provide WYSIWYG editing to customer entities, users, and the like of service provider server 120 when changing access rights and the like for users, groups, and others associated with the customer entity. For example, tool 402 may be used to present one or more of diagrams 300*a*-300*e* when creating, modifying, and/or deleting access rights and permissions via the WYSIWYG data visualization and editing provided in interface 400.

In this regard, tool 402 may present a WYSIWYG relationship and/or social graph having an entity 404 connected to a first team 406 and a second team 408 of entity 404. First team 406 and second team 408 may correspond to a group or other unit of entity 404, which may have their own permissions, access rights, and/or controls for members of each team. Thereafter, first team 406 may be connected to a user A 410 as a member of first team 406. Second team 408 may be connected to a user B 412*a* and a user C 412*b* of second team 408. Within second team 408, user C 412*b* may also be connected to a user D 412*c*, who may be a sub-member of the team, a user that is managed or associated with user C 412*b*, or the like. Thus, user C 412*b* may have or exert some employment relationship with user D 412*c*.

Using tool 402, a cursor 424 may be used with editing tools 414 in order to make changes to the relationship or social graph shown in user interface 400. For example, WYSIWYG editing may be done by selecting and/or utilizing one or more of an add option 416, a delete option 418, an edit option 420, and/or a change option 422 of editing tools 414 in user interface 400. This may cause a corresponding effect when modifying nodes, connectors, and/or edges in tool 402. For example, an entity viewing tool 402 on client device 110 may select one of editing tools 414 to make a change to the corresponding access rights within the relationship graph. This may provide automated reprogramming of the graph and/or security rule to achieve a desired outcome visually. Breaking or creating a path at any point in tool 402 may therefore cause automatic changing of the policies, security rules, and/or access rights without requiring manual effort for follow-up.

Figure 5A:
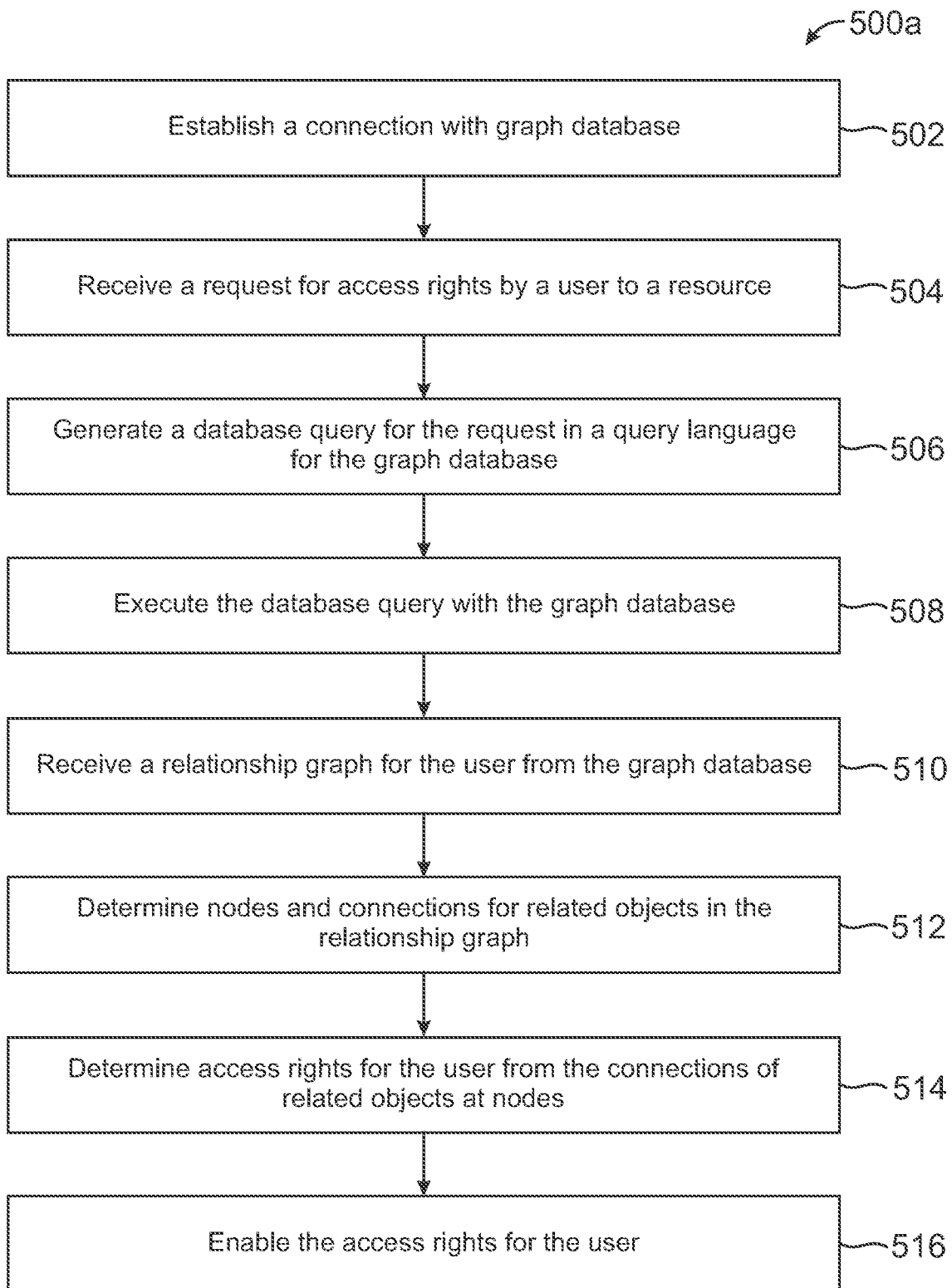
FIG. 5A is an exemplary flowchart for an authorization and access control system for access rights using relationship graphs, according to an embodiment.

FIG. 5A is an exemplary flowchart 500*a* for an authorization and access control system for access rights using relationship graphs, according to an embodiment. Note that one or more steps, processes, and methods of flowchart 500*a* described herein may be omitted, performed in a different sequence, or combined as desired or appropriate.

At step 502 of flowchart 500*a*, a connection with a graph database is established. This may be done by selecting a graph database and a corresponding graph database query language utilized and/or supported by a service provider that requests graph-based access control systems. Further, the connection may establish the APIs and API calls exchanged to persist policies with the graph database and/or query the graph database for relationship graphs and/or access rights (e.g., whether a user has access to a particular resource). At step 504, a request for access rights by a user to a resource is received. In some embodiments, the request may be to ascertain a specific access right, such as if a user can perform an action on a resource. However, in further embodiments, the request may further be to determine all access rights for a user, such as all resources that the user may act on and those corresponding permissions or access rights. Access rights may correspond to permissions for users, such as a data access permission, a spend permission, an administrative permission, a system authentication permission, or a spend velocity permission.

At step 506, a database query for the request is generated in a query language for the graph database. In this regard, the graph database may utilize a specific query language, such as AQL for ArangoDB™ databases. The query may be generated by converting and/or constructing an initial input or request for one or more access rights for a user and/or resource into the query language used by the graph database and/or query system. At step 508, the database query is executed with the graph database. The service provider's system may execute one or more API calls via APIs of the service provider and/or graph database in order to query the graph database for connections of users to groups or other objects and resources. The query may request that the graph database construct a relationship or social graph of users to resources, which include connections based on policies stored with the graph database.

At step 510, a relationship graph for the user is received from the graph database. The relationship graph may identify connections and pathways between users to resources based on different policies for the users and/or resources, as well as other objects for the corresponding computing team. For example, nodes of the graph may be represented as vertices, where the vertices correspond to different objects, such as users, groups, resources, and the like. Connections between different nodes in the graph may be represented as edges, which may have a vector that provides additional information, such as if the connected nodes indicate membership in a group, team, or the like, or whether the connected nodes indicate an access right to a resource. Thus, at step 512, nodes and connections for related object in the relationship graph are determined. This allows for identification of pathways over the relationship graph so that users access rights to resources may be determined. Each pathway may allow for identification of whether users have certain access rights and what are the corresponding resources.

At step 514, the access rights are determined for the user from the connections of related objects at the nodes. For example, the objects may correspond to users, groups, entities, resources, and the like, which may be designated at nodes so that edges may be formed from related nodes based on a policy. Pathways may then be made over the edges to determine when a pathway from a user can be linked to a resource, and therefore the access right of that user to the corresponding resource. The pathways may therefore be used to determine access rights of a user over a relationship graph. In further embodiments, the relationship graph and the pathways over the edges of the relationship graph may also be coded to be configurable. Thus, moving, adding, or deleting an edge between graph nodes, as well as a corresponding vector between the edges, may be used to adjust access rights. At step 516, the access rights are enabled for the user. This may include determining whether an access right is available to a user based on policies for the user that connects the user to a particular resource. If a pathway may be identified of a user to a resource, then even if a policy does not specifically enable that access right or permission, the relationship graph may be used to enable that permission and provide permission to the user for the access right to the resource.

Figure 5B:
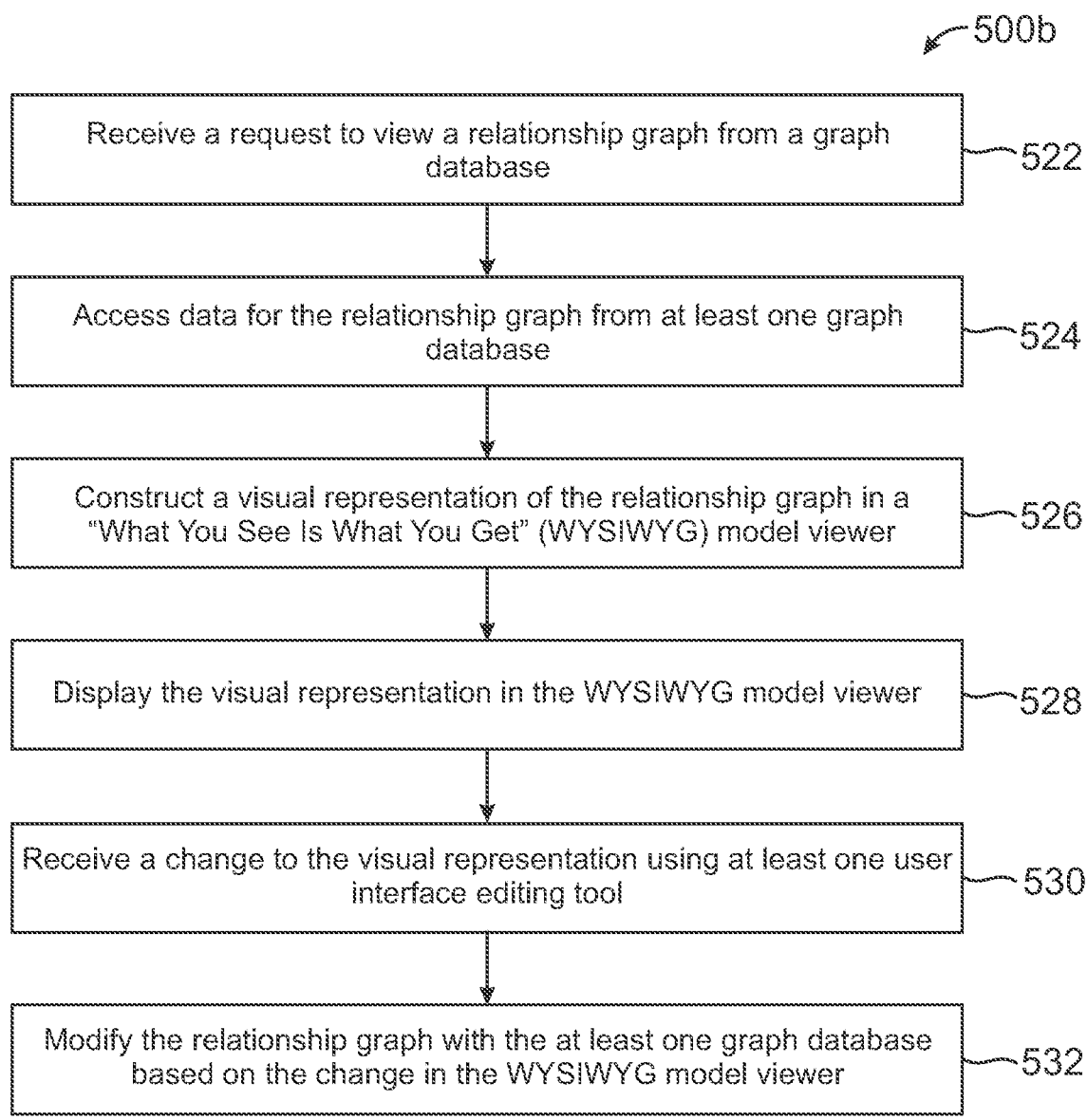
FIG. 5B is an exemplary flowchart for a security policy visualization and editing tool, according to an embodiment.

FIG. 5B is an exemplary flowchart 500b for a security policy visualization and editing tool, such as in FIG. 4, according to one embodiment. Note that one or more steps, processes, and methods of flowchart 500b described herein may be omitted, performed in a different sequence, or combined as desired or appropriate.

At step 522 of flowchart 500b, a request to view a relationship graph from a graph database is received. The request may correspond to a request to access, load, and view a relationship graph that includes nodes and connectors between different related objects associated with access rights of a user with an entity, such as a company, business, or other employment entity. This may be performed through a user interface of a computing device, which may provide one or more tools to edit the relationship graph through inputs made via the user interface. In this regard, the tool may provide for editing of the relationship graph without directly needing to access computing code and other infrastructural elements of a computing system for the entity in order to change access rights for different users, which allows for editing by end users of the entity without requiring professional coders, testers, and/or data scientists to enable, change, add, and/or delete access rights to computing resources, services, accounts, and the like of the entity.

At step 524, data for the relationship graph is accessed from at least one graph database. The database be accessed by executing one or more queries to a graph database, which may return a graphical representation of the data as the relationship graph. The data may include nodes as vertices or points in the graph, which may be connected through connectors to form edges that designate the relationships of users to groups, resources, assets, and the like, as well as access rights to or with those groups, resources, assets, and the like. At step 526, a visual representation of the relationship graph in a WYSIWYG model viewer is constructed. The visual representation may therefore correspond to the relationship graph generated through the nodes and connectors so that one or more end users of the entity may view how users, groups, resources, assets, and the like have relationships to each other and are connected, thereby designating access rights.

At step 528, the visual representation is displayed in the WYSIWYG model viewer. The WYSIWYG model viewer may further include one or more editing tools, which may be used to add, change, delete, or otherwise edit the nodes and/or connectors of the relationship graph. For example, removing a node may delete a user, where removing a connector between a user and an asset may delete an access right of the user to that asset. Adding a user and connecting to an asset may generate and/or define an access right of the user to the asset. The editing tools may be presented without requiring the user to directly change or manipulate underlying code of the entity's computing architecture for the access rights. This may allow any end user (e.g., end users that may not have experience or knowledge of the computing architecture) to change access rights without having to modify the code to change access rights.

At step 530, a change to the visual representation is received using at least one user interface editing tool. The change may correspond to changes of nodes and/or connectors, which may change related objects for users and their corresponding access rights with the entity. The at least one user interface editing tool may allow for directly changing the access rights via the user interface using the visual representation. Thus, at step 532, the relationship graph is modified with the at least one graph database based on the change in the WYSIWYG model viewer. The relationship graph may be changed to modify the access rights, and therefore allow for changing of access rights in the WYSIWYG model viewer. Modifying may include editing and/or persisting the changes to the access rights with the graph database so that the computing architecture of the entity is modified for the changes tot he access rights.

Figure 6:
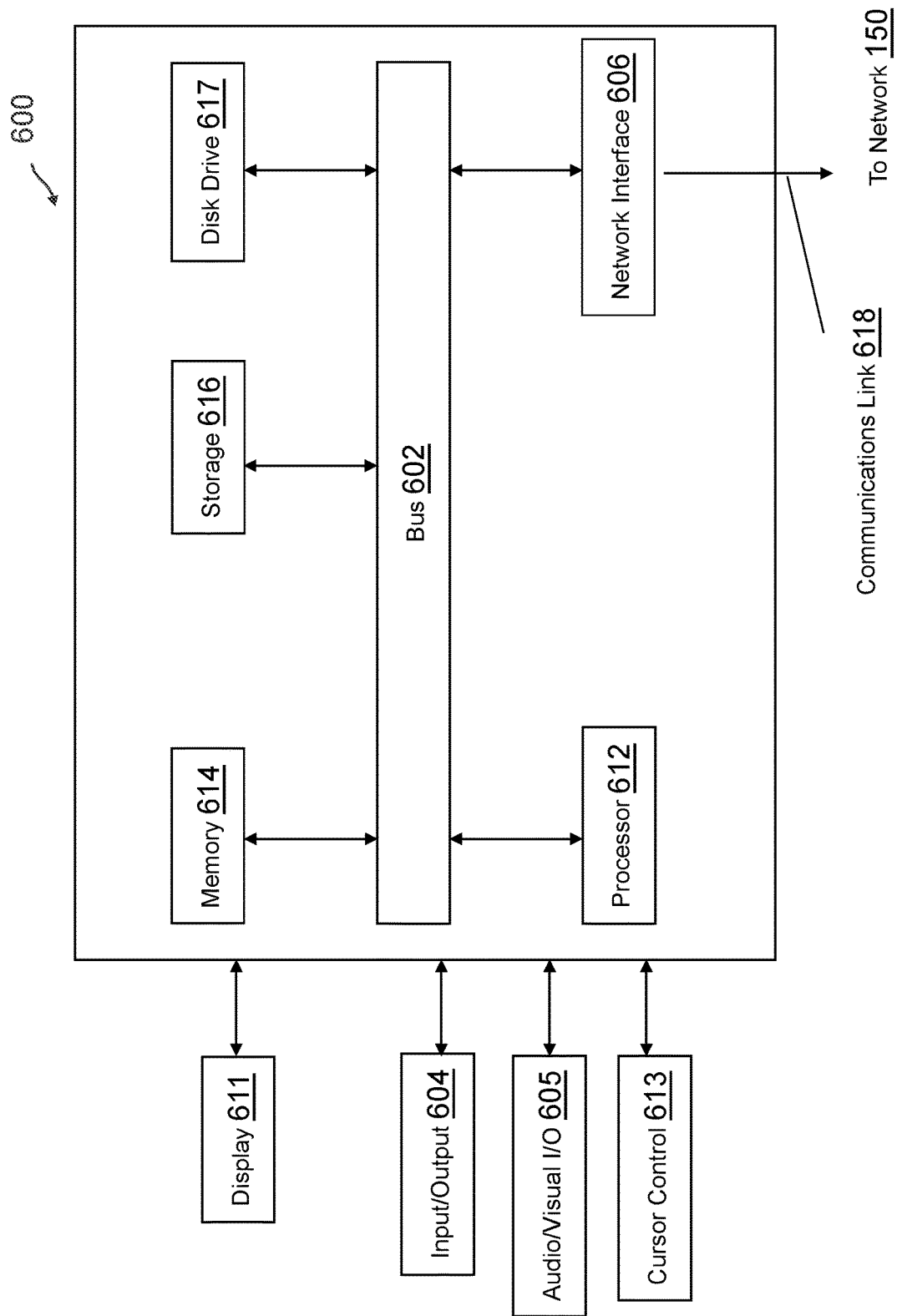
FIG. 6 is a block diagram of a computer system suitable for implementing one or more components in FIG. 1, according to an embodiment.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output (I/O) component 605 may also be included to allow a user to use voice for inputting information by converting audio signals and/or input or record images/videos by capturing visual data of scenes having objects. Audio/visual I/O component 605 may allow the user to hear audio and view images/video including projections of such images/video. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving, for an access control system, a request to view one or more access rights of a user;
   querying a graph database for a relationship graph of the user that includes one or more connections between nodes of related objects for the one or more access rights of the user;
   generating, within a user interface, a visual representation of the relationship graph for the user based on the querying;

displaying the visual representation in the user interface with at least one editing tool for the visual representation, wherein the at least one editing tool allows for changing the one or more access rights using the one or more connections and the nodes;

receiving a change to the visual representation in the user interface using the at least one editing tool to effectuate a delegation of a new access right to the user based on updated data for a user node of the user in the relationship graph;

modifying, based on the change, the relationship graph by creating a new connection from the user node to one of the nodes associated with the new access right, and wherein the new connection enables the graph database to be queried using multiple query types in a graph query language for the new access right of the user;

determining, for the new access right, a permission to a computing resource of an organization to the user via a plurality of applications, wherein the permission allows the user to access or modify data from the computing resource; and enabling, by the access control system, the change across the plurality of applications for the organization based on the modified relationship graph, wherein the enabling includes providing the permission to the user via the plurality of applications.

2. The method of claim 1, wherein the querying the graph database comprises:

executing at least one graph query using the graph query language to the graph database for the related objects; and determining, based on the executing the at least one graph query, vertices for the nodes and edges between the vertices for the one or more connections.

3. The method of claim 1, further comprising:

editing the relationship graph in the user interface based on one or more inputs for the change to the visual representation; and updating the visual representation with modifications to one or more access rights or the new access right as the one or more inputs are received.

4. The method of claim 3, further comprising:

persisting the change with the graph database in response to creating the new connection.

5. The method of claim 1, wherein each of the nodes comprises one of an actor vertex, a group vertex, or a resource vertex in the relationship graph are represented by Uniform Resource Name (URN) strings associated with at least one universally unique identifier (UUID) that does not need to be resolved using a network address, a virtual address, or personally identifiable information.

6. The method of claim 1, wherein each of the at least one editing tool enables editing of the one or more access rights in the user interface via the displayed visual representation independent of editing of computer code for the one or more access rights with a computing architecture of an entity providing the one or more access rights to the user.

7. The method of claim 1, wherein the user interface comprises the at least one editing tool for a "what you see is what you get" (WYSIWYG) model viewer.

8. A service provider system comprising:

a non-transitory memory; and one or more hardware processors coupled to the non-transitory memory and configured to read instructions from the non-transitory memory to cause the service provider system to perform operations comprising:

receiving, for an access control system, a request to view one or more access rights of a user;

querying a graph database for a relationship graph of the user that includes one or more connections between nodes of related objects for the one or more access rights of the user;

generating, within a user interface, a visual representation of the relationship graph for the user based on the querying;

displaying the visual representation in the user interface with at least one editing tool for the visual representation, wherein the at least one editing tool allows for changing the one or more access rights using the one or more connections and the nodes;

receiving input that is provided through the user interface using the at least one editing tool and is indicative of a change to the visual representation, wherein the change comprises a delegation of a new access right to the user based on updated data for a user node of the user in the relationship graph;

modifying, based on the change, the relationship graph by creating a new connection from the user node to one of the nodes associated with the new access right, and wherein the new connection enables the graph database to be queried using multiple query types in a graph query language for the new access right of the user;

determining, for the new access right, a permission to a computing resource of an organization to the user via a plurality of applications, wherein the permission allows the user to access or modify data from the computing resource; and enabling, by the access control system, the change across the plurality of applications for the organization based on the modified relationship graph, wherein the enabling includes providing the permission to the user via the plurality of applications.

9. The service provider system of claim 8, wherein the querying the graph database comprises:

executing at least one graph query using the graph query language to the graph database for the related objects; and determining, based on the executing the at least one graph query, vertices for the nodes and edges between the vertices for the one or more connections.

10. The service provider system of claim 8, wherein the operations further comprise:

editing the relationship graph in the user interface based on one or more inputs for the change to the visual representation; and updating the visual representation with modifications to one or more access rights or the new access right as the one or more inputs are received.

11. The service provider system of claim 10, wherein the operations further comprise:

persisting the change with the graph database in response to creating the new connection.

12. The service provider system of claim 8, wherein each of the nodes comprises one of an actor vertex, a group vertex, or a resource vertex in the relationship graph are represented by Uniform Resource Name (URN) strings associated with at least one universally unique identifier (UUID) that does not need to be resolved using a network address, a virtual address, or personally identifiable information.

13. The service provider system of claim 8, wherein each of the at least one editing tool enables editing of the one or more access rights in the user interface via the displayed visual representation independent of editing of computer code for the one or more access rights with a computing architecture of an entity providing the one or more access rights to the user.

14. The service provider system of claim 8, wherein the user interface comprises the at least one editing tool for a "what you see is what you get" (WYSIWYG) model viewer.

15. A non-transitory machine-readable medium having stored thereon machine-readable instructions executable to cause a machine to perform operations comprising:
receiving, for an access control system, a request to view one or more access rights of a user;
querying a graph database for a relationship graph of the user that includes one or more connections between nodes of related objects for the one or more access rights of the user;
generating, within a user interface, a visual representation of the relationship graph for the user based on the querying;
displaying the visual representation in the user interface with at least one editing tool for the visual representation, wherein the at least one editing tool allows for changing the one or more access rights using the one or more connections and the nodes;
receiving a change to the visual representation in the user interface using the at least one editing tool to effectuate a delegation of a new access right to the user based on updated data for a user node of the user in the relationship graph;
modifying, based on the change, the relationship graph by creating a new connection from the user node to one of the nodes associated with the new access right based on the change, and wherein the new connection enables the graph database to be queried using multiple query types in a graph query language for the new access right of the user;
determining, for the new access right, a permission to a computing resource of an organization to the user via a plurality of applications, wherein the permission allows the user to access or modify data from the computing resource; and
enabling, by the access control system, the change across the plurality of applications for the organization based on the modified relationship graph, wherein the enabling includes providing the permission to the user via the plurality of applications.

16. The non-transitory machine-readable medium of claim 15, wherein the querying the graph database comprises:
executing at least one graph query using the graph query language to the graph database for the related objects; and
determining, based on the executing the at least one graph query, vertices for the nodes and edges between the vertices for the one or more connections.

17. The non-transitory machine-readable medium of claim 15, wherein the operations further comprise:
editing the relationship graph in the user interface based on one or more inputs for the change to the visual representation; and
updating the visual representation with modifications to one or more access rights or the new access right as the one or more inputs are received.

18. The non-transitory machine-readable medium of claim 17, wherein the operations further comprise:
persisting the change with the graph database in response to creating the new connection.

19. The non-transitory machine-readable medium of claim 15, wherein each of the nodes comprises one of an actor vertex, a group vertex, or a resource vertex in the relationship graph are represented by Uniform Resource Name (URN) strings associated with at least one universally unique identifiers (UUIDs) that do not need to be resolved using a network address, a virtual address, or personally identifiable information.

20. The non-transitory machine-readable medium of claim 15, wherein each of the at least one editing tool enables editing of the one or more access rights in the user interface via the displayed visual representation independent of editing of computer code for the one or more access rights with a computing architecture of an entity providing the one or more access rights to the user.

* * * * *